April 18, 1950 B. BARNHART ET AL 2,504,625

TUBE JOINT

Filed Aug. 13, 1946

INVENTORS
Blair Barnhart
Earl A. Gott
BY
ATTORNEYS

Patented Apr. 18, 1950

2,504,625

UNITED STATES PATENT OFFICE 2,504,625

TUBE JOINT

Blair Barnhart, Philadelphia, and Earl A. Gott, Lansdowne, Pa., assignors to Sunroc Refrigeration Company, Dover, Del., a corporation of Delaware Application August 13, 1946, Serial No. 690,293

2 Claims. (Cl. 285—111)

Our invention relates to processes of joining tubes of substantially different sizes, and to the joints thus produced.

A purpose of our invention is to increase the reliability of joints between tubes of substantially dissimilar sizes in mass production.

A further purpose is to eliminate the necessity of special skill in joining tubes of dissimilar sizes, particularly by soldering, such as silver soldering.

A further purpose is to obtain joints between tubes of substantially different sizes which are of higher tensile strength, greater fatigue resistance, greater ductility, and smaller incidence of rejection.

A further purpose is to make possible firm positioning of the parts prior to and during soldering without the use of special jigs and fixtures.

A further purpose is to reduce the possibility of closing the end of the smaller tube by solder.

Further purposes appear in the specification and in the claims.

In the drawings we have chosen to illustrate a few only of the various embodiments in which the invention may appear, the forms shown being chosen from the standpoint of convenience in illustration, satisfactory operation and clear demonstration of the principles involved.

In the drawings like numerals refer to like parts.

Figure 1:
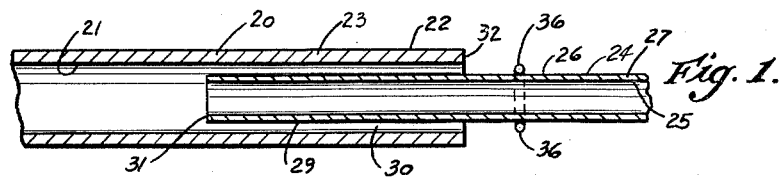
Figure 1 is a central longitudinal section showing the parts assembled ready for joining.

Describing in illustration but not in limitation, and referring to the drawings:

In the prior art difficulty has been encountered in making welded or soldered joints between tubes of substantially dissimilar sizes, and in particular considerable skill has been required to prevent a substantial rejection rate due to leakage or porosity, incomplete soldering, closing of the inner tube during soldering or welding and introducing of fins of fuse material likely to break off and be carried into moving parts of a refrigeration system or the like. Furthermore, many of the prior art joints have had poor tensile properties, with limited ductility, and have been prone to fatigue failures, especially where vibratory stresses were applied. The present joint is designed to overcome these difficulties.

While the best application of the invention is believed to be to the joining of copper or brass tubes which are to be silver soldered together, it will be understood that the invention may be applied to any suitable metallic tubular members, whether made of ferrous or non-ferrous metals, and whether properly designated as pipes, tubes or otherwise.

In Figure 1 we illustrate a portion of the end of a larger tube 20, having an internal bore 21 and an external surface 22, as well as a tube wall 23. We also show in this view a smaller tube 24, having an internal bore 25, an external surface 26 and a tube wall 27. In order to make the present joint practical, the external diameter at 26 on the smaller tube must be sufficiently smaller than the bore 21 of the larger tube to permit the smaller tube to extend into the larger tube as shown at 29, preferably but not essentially with some clearance 30.

As subsequently noted, in order to avoid closing the end 31 of the inner tube, the portion of the inner tube located at 29 extending into the outer tube should be comparatively long as shown, and there should be substantial distance between the end 31 of the inner tube and the end 32 of the outer tube.

The next step in the operation is to constrict the outer tube at 33 in any suitable manner, as by rolling it circumferentially with a wheel 34 under suitable pressure.

The constriction 33 is desirably located as shown a substantial distance from the end 31 of the inner tube so as to avoid closing the end 31 of in the subsequent soldering, and also is preferably located a substantial distance from the end 32 of the outer tube as shown, to provide a gradual rather than a sharp grip by the outer tube on the inner tube, which will be favorable to good fatigue resistance on the inner tube, and also where the inner tube is substantially spaced from the outer tube at 30, to provide at the outer end a cup 35 which will aid in distributing the solder, and preferably receive a silver solder ring 36, desirably previously slid over the smaller tube before assembling the parts.

Figure 2:
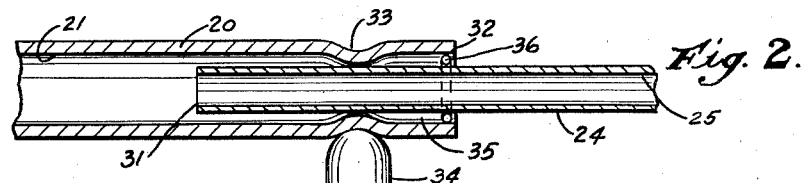
Figure 2 is a view corresponding to Figure 1, showing the tubes after constriction.
Figure 5:
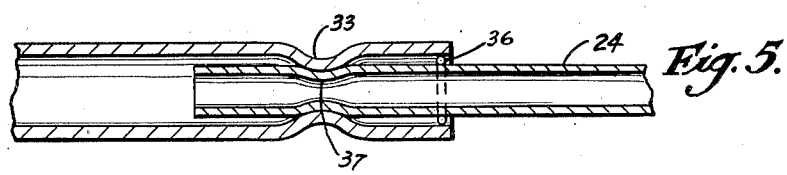
Figure 5 is a view similar to Figure 2 showing variations.

The constriction may be merely sufficient to contact and preferably slightly grip the inner tube as shown in Figure 2, but it will be preferably sufficient to exert pressure on and slightly constrict the inner tube also as shown at 37 in Figure 5. Thus in the preferred embodiment, there will be actual contact with the inner tube by the outer tube throughout its circumference at the constriction 33, and preferably a positive gripping action that holds the parts firmly together prior to soldering. This has a further great advantage, because the effectiveness of the silver solder joint in producing a structure of high tensile strength and good fatigue resistance is greatly increased when the clearance between the parts through which the silver solder must flow is very minute.

In the next step the joint is heated preferably by applying a torch or the like to the outside of the constriction 33, thus melting the solder and permitting it to flow into the space 38 where the inner tube is gripped by the outer tube at the constriction, and also to form beads containing surplus solder extending annularly around the inner tube at 39 and 40 in the clearance space 30 between the tubes.

Figure 3:
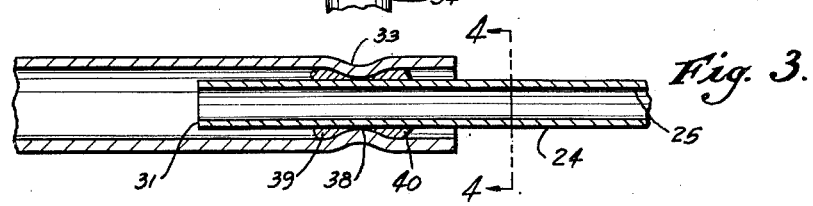
Figure 3 is a view similar to Figures 1 and 2, showing the parts after soldering.
Figure 4:
Figure 4 is a section on the line 4—4 of Figure 3.
Figure 6:
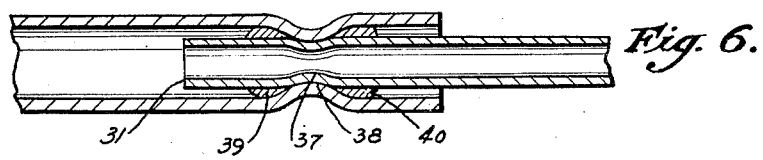
Figure 6 is a view similar to Figure 3 of the variations of Figure 5.

This outer bead 40, seen in Figures 3 and 6, is of particular advantage because being normally somewhat softer than the metal of the tubes themselves, it will provide some cushioning and damping in the case of stresses tending to bend the inner tube with respect to the outer tube in a direction perpendicular to their common axis at the joint.

It will be evident that in the present invention, the remoteness of the end 31 of the inner tube makes it unlikely that solder will flow over and close the end or spread partly across the end in the form of a fin.

It will also be evident that in the case of tensile loads, longitudinally of the tubes, the joint is very strong not only because of the gripping action by the outer tube, but also because there is a comparatively small section of solder loaded in shear at 38, and therefore there is little likelihood of a shear failure of the type which may occur in prior art joints.

In view of our invention and disclosure variations and modifications to meet individual whim or particular need will doubtless become evident to others skilled in the art, to obtain all or part of the benefits of our invention without copying the structure and process shown, and we, therefore, claim all such insofar as they fall within the reasonable spirit and scope of our claims.

Having thus described our invention what we claim as new and desire to secure by Letters Patent is:

1. In a tube joint, a smaller metallic tube, a larger metallic tube enveloping the smaller tube in spaced relation for a substantial distance beyond the end of the smaller tube and annularly constricted adjacent its end and a substantial distance from the end of the smaller tube, in upon and into gripping engagement with the smaller tube, there being a fusion metal cup in the space between the tubes adjacent the end of the larger tube and fusion metal uniting the larger tube and the smaller tube at the constriction.

2. In a tube joint, a smaller metallic tube, a larger metallic tube whose bore is substantially larger than the outside diameter of the small tube extending around the smaller tube for a substantial distance beyond the end of the smaller tube, annularly constricted a sufficient distance from its end to form a solder cup between the tubes at the end of the larger tube, the annular constriction being at a substantial distance from the end of the smaller tube, and the larger tube being in gripping engagement with the smaller tube, and solder uniting the tubes at the constriction.

BLAIR BARNHART.
EARL A. GOTT.

REFERENCES CITED

The following references are of record in the file of this patent:

UNITED STATES PATENTS

| Number | Name | Date |
|---|---|---|
| 309,247 | Patterson | Dec. 16, 1884 |
| 1,770,852 | Hill | July 15, 1930 |
| 2,121,558 | Coe et al. | June 21, 1938 |
| 2,209,181 | Wendel | July 23, 1940 |

OTHER REFERENCES

Bulletin No. 12, copyright 1941, Handy and Harman, 82 Fulton St., New York, N. Y. (Copy in Div. 14.)

Metals Handbook, Pub. by A. S. M., Cleveland 3, Ohio, copyright 1939, page 1212. (Copy in Div. 14.)